(12) United States Patent  (10) Patent No.: US 8,435,453 B2
Georg et al.  (45) Date of Patent: May 7, 2013

(54) DEVICE FOR PERFORMING CHEMICAL AND/OR PHYSICAL REACTIONS BETWEEN A SOLID MATERIAL AND A GAS

(75) Inventors: Verena Georg, Herdecke (DE); Detlev Kupper, Telgte (DE); Andreas Hoppe, Lippstadt (DE); Heinz-Werner Thiemeyer, Ennigerloh (DE); Daniel Klegraf, Rüthen-Westereiden (DE); Thomas Deck, Ennigerloh (DE); Stefanie Richter, Oelde (DE); Luis Lagar Garcia, Oviedo (ES)

(73) Assignee: Polysius AG, Beckum (DE)

( * ) Notice: Subject to any disclaimer, the term of this patent is extended or adjusted under 35 U.S.C. 154(b) by 122 days.

(21) Appl. No.: 13/003,130

(22) PCT Filed: Jun. 25, 2008

(86) PCT No.: PCT/EP2008/058101
§ 371 (c)(1),
(2), (4) Date: Feb. 16, 2011

(87) PCT Pub. No.: WO2009/155973
PCT Pub. Date: Dec. 30, 2009

(65) Prior Publication Data
US 2011/0165031 A1  Jul. 7, 2011

(51) Int. Cl.
*F27B 15/08* (2006.01)
*F27B 15/00* (2006.01)
*B01J 8/18* (2006.01)
*B01J 19/00* (2006.01)

(52) U.S. Cl.
USPC ............ 422/147; 422/129; 422/139; 422/198

(58) Field of Classification Search .................. 422/129, 422/139, 147, 198, 243, 255, 285
See application file for complete search history.

(56) References Cited

U.S. PATENT DOCUMENTS

| 2,866,272 | A | | 12/1958 | Sigurd |
| 3,207,484 | A | * | 9/1965 | Rubin ........................... 366/336 |
| 3,904,353 | A | * | 9/1975 | Bosshard et al. ............... 432/14 |
| 3,975,148 | A | * | 8/1976 | Fukuda et al. ................ 432/106 |
| 4,022,568 | A | * | 5/1977 | Meedom ......................... 432/14 |
| 4,039,277 | A | * | 8/1977 | Kobayashi et al. ............ 432/106 |
| 4,071,310 | A | * | 1/1978 | Ghestem ....................... 432/106 |
| 4,119,396 | A | * | 10/1978 | Abelitis et al. ................ 432/106 |
| 4,191,526 | A | * | 3/1980 | Triebel ........................... 432/58 |

(Continued)

*Primary Examiner* — Jill Warden
*Assistant Examiner* — Natasha Young
(74) *Attorney, Agent, or Firm* — Renner Kenner Greive Bobak Taylor & Weber

(57) ABSTRACT

A device for performing chemical and/or physical reactions between a solid material and a gas, especially for preheating, cooling and/or calcining fine-grained materials has at least three stages arranged one above the other, each stage comprising the following components: a. a gas-solids suspension duct for conducting a gas-solids suspension, b. means for separating the delivered solid material from the delivered gas, c. a solids duct for discharging the separated solid material, d. and a gas duct for discharging the separated gas, the gas duct of one stage merging into the gas-solids suspension duct of the next-higher stage and the solids duct of one stage joining the gas-solids suspension duct of the next lower stage. In addition, the junction of the solids duct and the gas-solids suspension duct of the third or a higher stage is provided below the highest point of the gas-solids suspension duct arranged two stages lower.

5 Claims, 5 Drawing Sheets

U.S. PATENT DOCUMENTS

| | | | | |
|---|---|---|---|---|
| 4,248,641 A | * | 2/1981 | Deussner | 106/750 |
| 4,318,692 A | | 3/1982 | Hess | |
| 4,715,811 A | * | 12/1987 | Lawall | 432/58 |
| 5,217,368 A | * | 6/1993 | Rodet | 432/106 |
| 5,269,637 A | * | 12/1993 | Gomes, Jr. | 406/173 |
| 6,574,885 B1 | * | 6/2003 | Pospisil et al. | 34/592 |

* cited by examiner

DEVICE FOR PERFORMING CHEMICAL AND/OR PHYSICAL REACTIONS BETWEEN A SOLID MATERIAL AND A GAS

TECHNICAL FIELD

The invention relates to a device for performing chemical and/or physical reactions between a solid material and a gas, especially for preheating, cooling and/or calcining fine-grained materials, having several stages arranged one above the other.

BACKGROUND OF THE INVENTION

In particular, systems comprising parallel-flow heat exchangers and cyclone separators are known from practice for the preheating, cooling and/or calcining of fine-grained materials. Such devices generally have several stages arranged one above the other, the gas stream being conducted from the bottom to the top through all of the stages, while the solid material is delivered to the individual stages in the opposite direction.

Such systems have the disadvantage that they require an enormous overall height and the degree of separation in the cyclone separator is not always satisfactory. For instance, uncontrolled flow often occurs in the cyclones, this being caused, for example, at the cyclone inlet by the inlet gas stream being overlaid by the swirling current formed in the cyclone or by the reversal of the direction of gas flow in the cone of the cyclone. Furthermore, the particles already separated at the edge of the cyclone may be scattered back into the gas inlet stream of the cyclone.

A further problem resides in the fact that, in the case of structural forms of different sizes, the centrifugal forces change, with the same inlet rates, thereby giving rise to other separating conditions.

U.S. Pat. No. 4,318,692 therefore proposed a multi-stage preheater for cement raw material, the individual stages of which each comprise a riser and an adjoining helical and/or spiral duct. The helical and/or spiral duct has a rectangular cross-section and is connected to one side of a quadrangular hopper in which the solid material and the gas are finally separated by centrifugal and inertial forces.

SUMMARY OF THE INVENTION

The object of the invention is to reduce the device for performing chemical and/or physical reactions between a solid material and a gas with regard to the overall height.

The device according to the invention for performing chemical and/or physical reactions between a solid material and a gas, especially for preheating, cooling and/or calcining fine-grained materials has at least three stages arranged one above the other, each stage comprising the following components:
a. a gas-solids suspension duct for conducting a gas-solids suspension,
b. means for separating the delivered solid material from the delivered gas,
c. a solids duct for discharging the separated solid material,
d. and a gas duct for discharging the separated gas, the gas duct of one stage merging into the gas-solids suspension duct of the next-higher stage and the solids duct of one stage joining the gas-solids suspension duct of the next-lower stage.

In addition, the junction of the solids duct and the gas-solids suspension duct of the third or a higher stage is provided below the highest point of the gas-solids suspension duct arranged two stages lower.

With such a structure, a marked reduction in the overall height of the device can be achieved.

Further configurations of the invention are the subject-matter of the subordinate claims.

According to a preferred configuration of the invention, the gas-solids suspension duct comprises an ascending and a descending duct portion which may be formed by a riser and a descending helical and/or spiral duct. A redirecting head which connects the riser to the helical and/or spiral duct may also be provided. Owing to the ascending and descending duct portion, on the one hand sufficient contact time between the solid material and the gas is ensured and, on the other hand, the overall height can be further reduced.

A helical and/or spiral duct in the context of the invention is to be understood as being a duct which is in a helical and/or spiral shape at least in portions. The turning of the helical and/or spiral duct may, in particular, also extend over only a relatively small angular range of, for example, 90°.

In a further configuration, the helical and/or spiral ducts of consecutive stages have alternating left-handed and right-handed orientations. The changing direction of turn gives an extremely compact construction of the device, which permits a further reduction in the overall height. For example, a reduction in the overall height of up to 25% can be achieved in comparison with a conventional five-stage cyclone-suspension type heat exchanger.

It may also be provided that the solids duct and the gas duct are connected to the end of the helical and/or spiral duct, there being provided, for example, at the end of the helical and/or spiral duct, a separating chamber to which the solids duct for discharging the solids stream and the gas duct for discharging the gas stream are connected.

Further advantages and configurations of the invention are explained in more detail hereinafter by means of the description and the drawings.

DETAILED DESCRIPTION OF THE INVENTION

Figure 1:
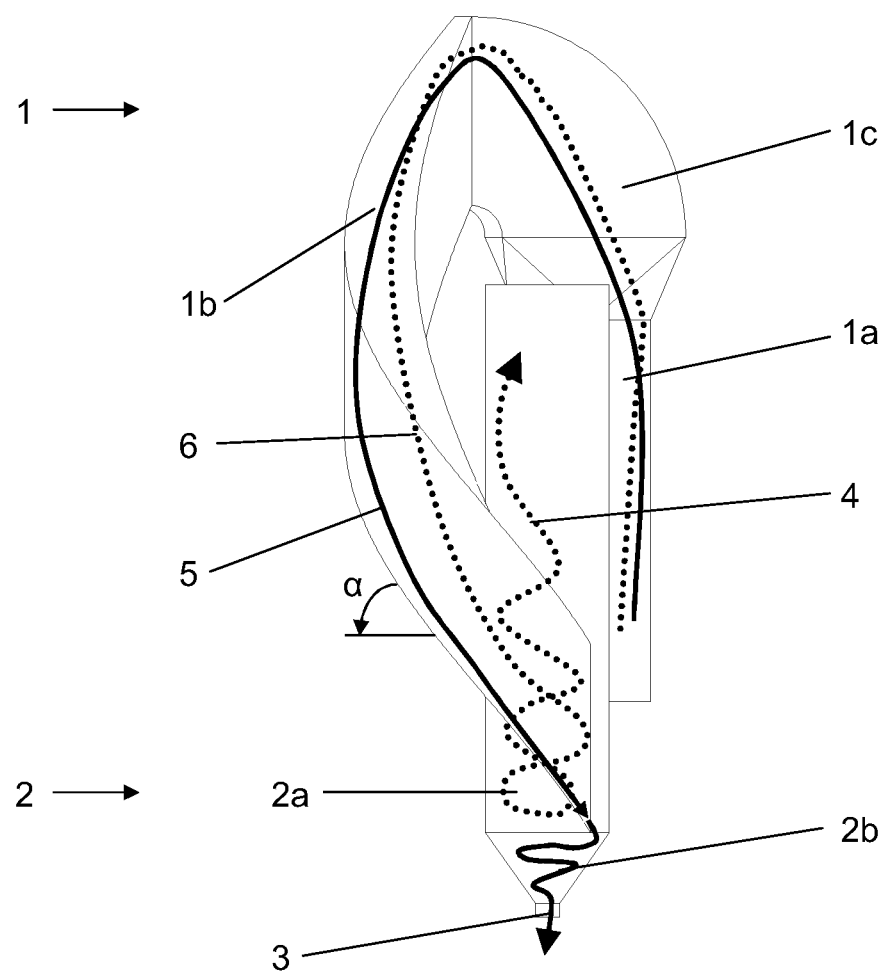
FIG. 1 is a side view of one stage of the device.
Figure 2:
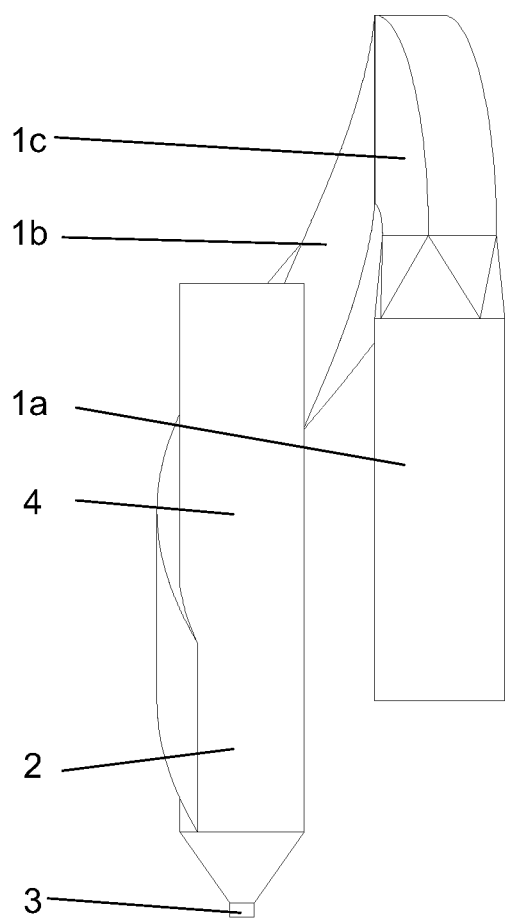
FIG. 2 is a side view according to FIG. 1 rotated through 90°.
Figure 3:
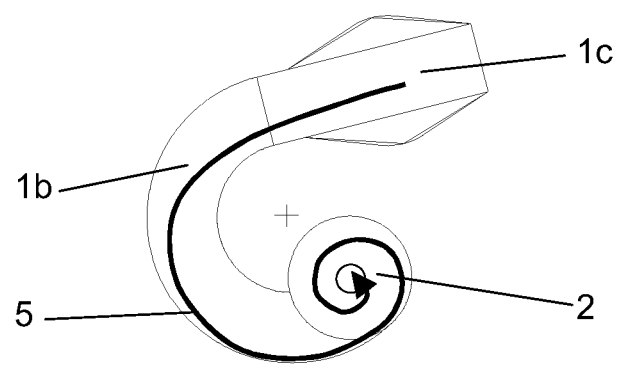
FIG. 3 is a plan view of the stage according to FIG. 1.

First of all, FIGS. 1 to 3 show in detail one stage of a device for performing chemical and/or physical reactions between a solid material and a gas, especially for preheating, cooling and/or calcining fine-grained materials.

It basically comprises a gas-solids suspension duct 1, means for separating the delivered solid material from the delivered gas, which, in the embodiment shown, are formed by a separating chamber 2, a solids duct 3 for discharging the separated solid material and a gas duct 4 for discharging the separated gas.

In order to perform chemical and/or physical reactions between a solid material 5 and a gas 6, the gas-solids suspension is delivered to the separating chamber 2 by way of the gas-solids suspension duct 1.

The gas-solids suspension duct 1 has an ascending duct portion in the form of a riser 1a and a descending duct portion in the form of a helical and/or spiral duct 1b. Also provided is a redirecting head 1c which connects the riser 1a to the helical and/or spiral duct 1b. Viewed in the vertical direction, at least the beginning of the helical and/or spiral duct 1b is positioned higher up than its mouth end at the separating chamber 2. In the helical and/or spiral duct 1b, the gas-solids suspension is separated into a solids stream and a gas stream owing to the centrifugal forces.

In the context of the invention, it is possible for the radius and/or the ascending gradient and/or the cross-sectional shape and/or the cross-sectional size of the helical and/or spiral duct 1b to change in the direction of flow of the gas-solids suspension. Thus, on the one hand, it is possible to influence the pre-separation of the gas-solids suspension in the region of the helical and/or spiral duct and, on the other hand, it is possible to adapt the helical and/or spiral duct 1 to external conditions. This is especially advantageous when several stages are interlocked and arranged one above the other.

The radius, ascending gradient, cross-sectional shape and/or cross-sectional size can change in the direction of flow discontinuously and/or, at least in one portion, also continuously. Thus, for example, a reduction in the radius brings about an increase in the centrifugal force, while an increase in the radius corresponds to a reduction in the centrifugal force. By altering the cross-sectional shape and size, it is possible to influence the rate of flow.

In the embodiment shown, the helical and/or spiral duct 1b joins the separating chamber 2 tangentially at an angle $\alpha$ to the horizontal of at least 30°. In the region of the junction, the separating chamber 2 has a cylindrical portion 2a which is adjoined below by a portion 2b which tapers in the shape of a funnel.

The solids duct 3 is connected to the portion 2b of the separating chamber that tapers in the shape of a funnel, while the cylindrical portion 2a merges into the gas duct 4.

In the embodiment shown, the gas duct 4 and the cylindrical portion 2a of the separating chamber have the same diameter. It could therefore also be said that the separating chamber is formed by the lower portion of the gas duct 4.

In the context of the invention, it would also be possible for the gas duct 4 to project into the separating chamber 2 in the manner of an immersion tube or to be constructed with a larger diameter than the separating chamber. Owing to the helical and/or spiral duct 1b which is directed obliquely downwards and which is connected to the separating chamber tangentially, the solid material is conducted in an arc into the portion 2b of the separating chamber 2 that tapers in the shape of a funnel and then passes into the solids duct 3 (see FIGS. 1 and 3).

At the inner wall of the cylindrical portion of the separating chamber 2, the gas 6 is drawn off upwardly into the gas duct 4 with a swirling motion (see FIG. 1). The flow, directed obliquely downwards, in the separating chamber 2 also prevents the inlet gas stream from being overlaid by the swirling flow formed in the separating chamber in the region of the mouth of the helical and/or spiral duct 1b.

The means for separating the delivered solid material from the delivered gas can, however, also be constructed entirely or in part in the gas-solids suspension duct 1.

As can be seen from FIG. 3, the helical and/or spiral duct 1b extends over an angular range of approximately 180°. In the context of the invention, the angular range can, however, also be selected to be markedly larger or smaller. It is also possible for the radius and/or the ascending gradient and/or the cross-sectional shape and/or the cross-sectional size of the helical and/or spiral duct 1b to change in the direction of flow of the gas-solids suspension.

The device according to the invention for performing chemical and/or physical reactions between a solid material and a gas, especially for preheating, cooling and/or calcining fine-grained materials, comprises several stages arranged one above the other, as described above with reference to FIGS. 1 to 3. The gas duct of one stage merges into the gas-solids suspension duct of the next-higher stage and the solids duct of one stage joins the gas-solids suspension duct of the next-lower stage.

Figure 4:
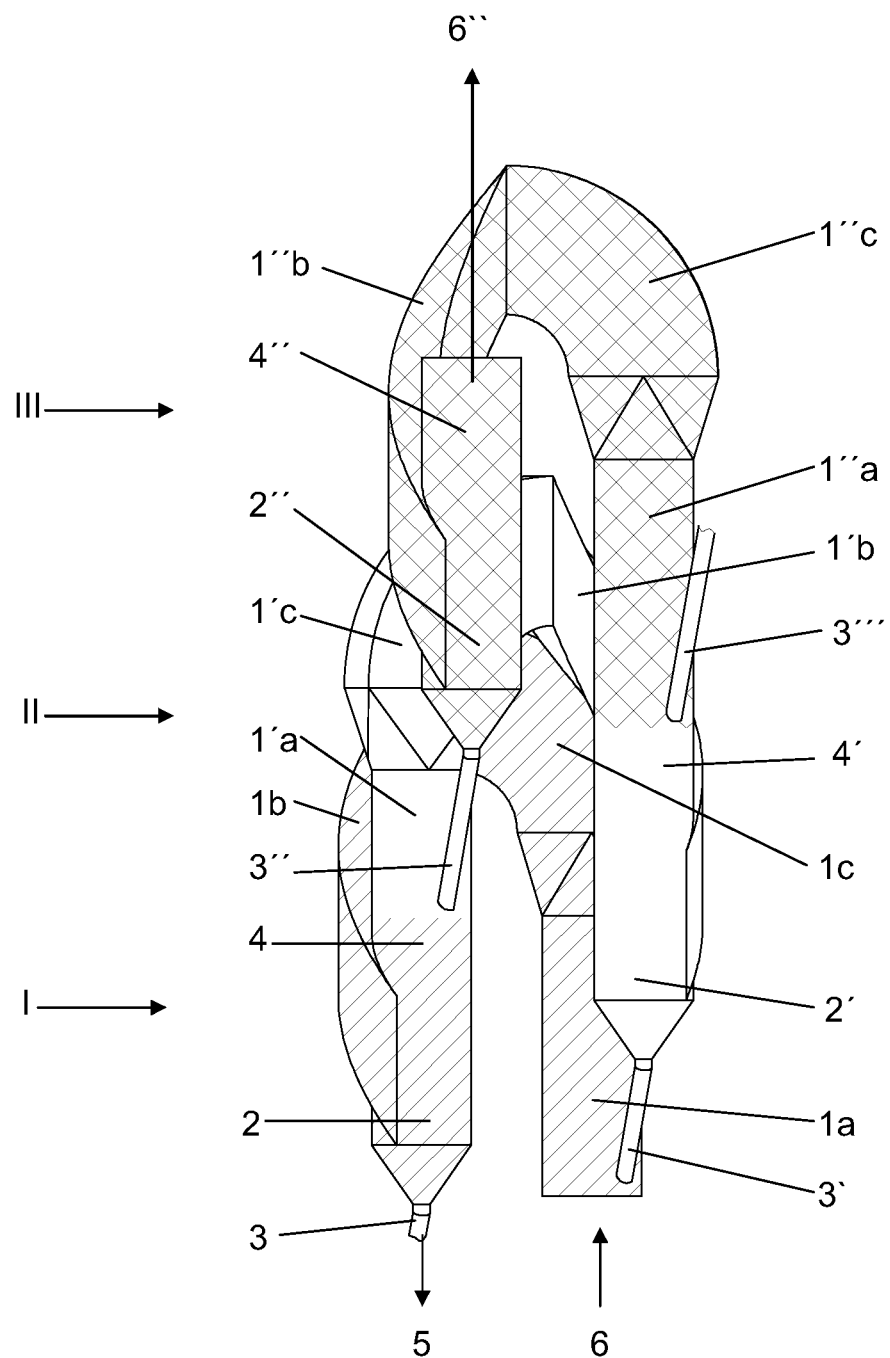
FIG. 4 is a side view of the device having three stages arranged one above the other and
FIG. 5 is a plan view of the device according to FIG. 4.
Figure 5:
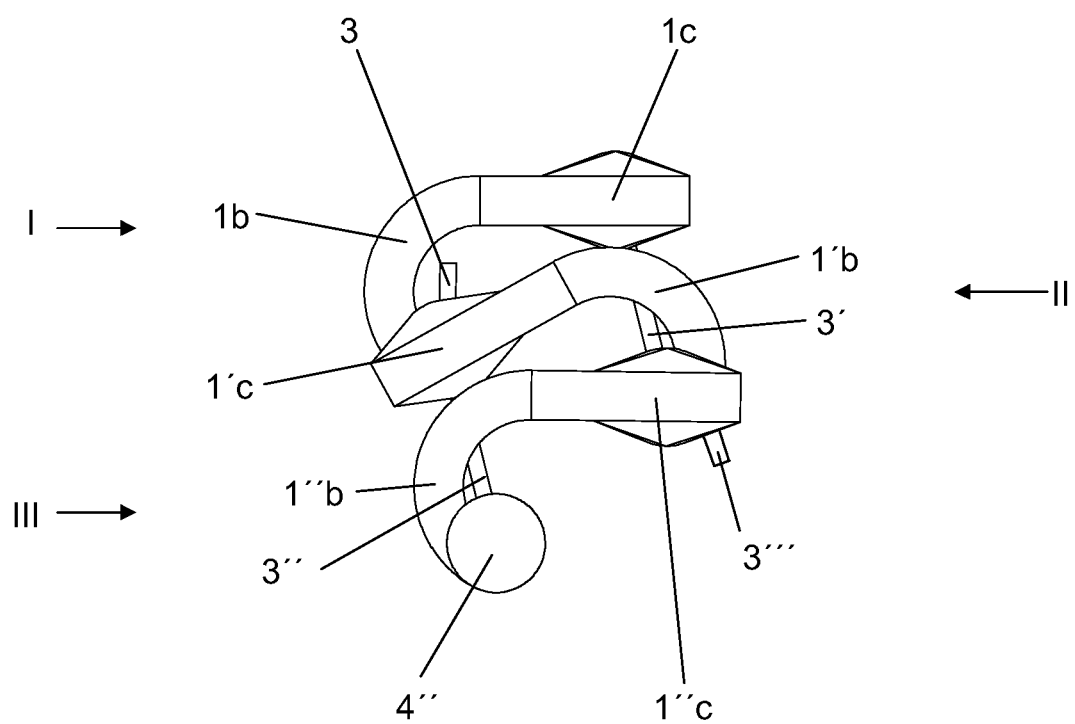

A device having three stages I, II, III which is, for example, a three-stage preheater for cement raw material, is described hereinafter with reference to FIGS. 4 and 5.

In such a multi-stage arrangement, a solid material to be treated is delivered to the uppermost stage III by way of a solids duct 3''' and is drawn off as a treated solid material 5, for example, a preheated solid material, from the lowermost stage I. While the solid material is thus guided through the three stages from the top to the bottom, the gas flows through the arrangement in the opposite direction. The gas 6 to be delivered to the lowermost stage is, for example, the hot exhaust gas of a kiln or a calciner. The gas 6" drawn off from the third stage by way of the gas duct 4" is, for example, for the purpose of dust removal, delivered to a filter, or to a highly efficient separator arranged downstream. The treated solid material 5 passes, for example, into a calciner or a kiln for further processing.

Owing to the construction of the gas-solids suspension duct 1 with a riser 1a and a descending helical and/or spiral duct 1b, the three stages can be arranged very compactly and in such a manner that they are intertwined. It is also provided that the helical and/or spiral ducts 1b, 1'b, 1"b of at least two consecutive stages are oriented alternately with a left-handed and right-handed turn (see FIG. 5). In plan view, the gas-solids suspension ducts, especially the helical and/or spiral ducts of two stages following each other in the direction of gas flow, can be arranged in a meandering shape.

An especially low structural form can be achieved if, in the case of at least three stages arranged one above the other, the junction of the solids duct and the gas-solids suspension duct of the third or a higher stage is provided below the highest point of the gas-solids suspension duct arranged two stages lower. In the embodiment shown, it can be clearly seen that the solids duct 3''', which is connected to the riser 1"a of the third stage III, is provided below the highest point of the gas-solids suspension duct of the lowermost stage I.

It is also possible in the context of the invention to provide at least two parallel strings with at least three stages each.

The invention claimed is:

1. Device for performing chemical and/or physical reactions between a solid material and a gas, especially for preheating, cooling and/or calcining fine-grained materials, the device having at least three stages arranged one above the other, each stage comprising the following components:
   a. a gas-solids suspension duct for conducting a gas-solids suspension,
   b. means for separating the delivered solid material from the delivered gas,
   c. a solids duct for discharging the separated solid material, and
   d. a gas duct for discharging the separated gas,
      the gas duct of one stage merging into the gas-solids suspension duct of the next-higher stage and the solids duct of one stage joining the gas-solids suspension duct of the next-lower stage, characterised in that the junction of the solids duct and the gas-solids suspension duct of the third or a higher stage is provided below the highest point of the gas-solids suspension duct arranged two stages lower.

2. Device according to claim 1, characterised in that the gas-solids suspension duct comprises an ascending and a descending duct portion.

3. Device according to claim 1, characterised in that the gas-solids suspension duct is at least partially in the form of a helical and/or spiral duct.

4. Device according to claim 3, characterised in that the helical and/or spiral ducts of consecutive stages have alternating left-handed and right-handed orientations.

5. Device according to claim 1, characterised in that there are provided at least two parallel strings having at least three stages each.

\* \* \* \* \*